United States Patent [19] [11] 4,000,665
Rabenhorst [45] Jan. 4, 1977

[54] WOVEN FILAMENT ROTOR STRUCTURE

[75] Inventor: David W. Rabenhorst, Clarksville, Md.

[73] Assignee: The Johns Hopkins University, Baltimore, Md.

[22] Filed: Aug. 26, 1975

[21] Appl. No.: 607,919

[52] U.S. Cl. .............................................. 74/572
[51] Int. Cl.² ...................................... F16C 15/00
[58] Field of Search ..................... 74/572; 428/902

[56] References Cited
UNITED STATES PATENTS

| 1,567,574 | 12/1925 | Clay | 74/572 UX |
| 2,621,140 | 12/1952 | Bitterli et al. | 74/572 UX |
| 3,788,162 | 1/1974 | Rabenhorst et al. | 74/572 |

Primary Examiner—Samuel Scott
Assistant Examiner—F. D. Shoemaker
Attorney, Agent, or Firm—Robert E. Archibald; Kenneth E. Darnell

[57] ABSTRACT

The invention relates to inertial energy storage devices comprised of anisotropic filamentary elements and comprises several embodiments of a disc flywheel which, although consisting essentially of anisotropic elements, is effectively isotropic in total structural character. A preferred embodiment of the invention is generally formed by weaving anisotropic filamentary elements together at regular angles to each other, certain of the woven anisotropic elements being parallel to each other to form essentially unidirectional layers within each woven disc-like unit. The woven disc-like units thus formed are bonded together to form a structure of useable size, the units being either randomly oriented relative to each other or oriented at regular angles to each other.

13 Claims, 5 Drawing Figures

WOVEN FILAMENT ROTOR STRUCTURE

STATEMENT OF GOVERNMENT INTEREST

The invention herein described was made in the course of or under a contract or subcontract with the Department of the Navy.

The Government also has rights in the invention pursuant to Grant No. AER 75-20607 awarded by the National Science Foundation.

CROSS-REFERENCE TO RELATED APPLICATIONS

The present invention particularly relates to the subject matter described in U.S. Pat. No. 3,788,162, issued Jan. 29, 1974, of which the present inventor is a joint inventor.

BACKGROUND OF THE INVENTION

1. Field of the Invention

The invention relates to energy storage devices, such as flywheels, and particularly to high-speed rotary structures having high volumetric and cost efficiency.

2. Description of the Prior Art

The flywheel has been used for centuries as an energy storage device. Since the flywheel is an inertial device governed by the laws of kinetic energy, maximum performance is attained at maximum speed, the performance being generally quadrupled with a two-fold increase in speed. The speed of the rotating body, however, cannot be increased beyond its bursting limit. In the prior art, three general flywheel configurations are predominant, namely, the flat disc type characterized by smooth parallel surfaces between the hub and the periphery; the rim type having a massive peripheral portion secured to the hub by spokes or by a solid wheel portion; and the more recently developed optimized disc.

Materials used to fabricate high-energy flywheels must have large specific strengths (strength/density) to enable the structure to be rotated at a high velocity. High strength steel has ordinarily been chosen as flywheel material. However, the strength/density ratio of an isotropic steel structure is substantially less than that obtainable with modern anisotropic filamentary materials. High strength filaments typically exhibit substantially greater strength-to-density characteristics over the best isotropic materials, such as steel or titanium. Rotary energy storage devices fabricated from these high strength filaments have greatly increased energy densities when compared to isotropic structures. However, the volumetric efficiencies, i.e., watt hours per unit volume of rotor, of most filamentary rotors is low. Further, the cost of these high strength filamentary rotors is often prohibitive for a number of applications.

The present inertial energy storage device offers substantial improvement in usable energy density due not only to the advantageous utilization of the high uniaxial strength of filamentary materials, but also to the increased packaging densities provided by the several embodiments of the invention, thereby improving volumetric efficiency. Further, costs of the several embodiments of the invention are significantly lower than that of pior art filamentary rotors.

The significance of the present energy storage device is best understood by its application to the urban vehicle. Although flywheels have been used in short-range vehicles, such as in the Swiss Oerlikon bus and in the British Gyreacta transmission, those devices produced only about three watt-hours per pound. Thus, energy density of the devices was even lower than that of available lead-acid batteries at the same discharge rate. However, certain characteristics of flywheels caused their use in preference to storage batteries, despite the problems then encountered in the use of flywheel structures. Firstly, the flywheel can be charged and discharged virtually an infinite number of times without degrading performance. Secondly, it can be charged at any reasonable rate. Thirdly, it can be discharged at any rate within the design limitations of ancillary equipment without degrading performance. These capabilities are largely responsible for the proposed use of flywheels in pollution-free urban vehicles. In most previous proposals, the rapid discharge capability of the flywheel has been primarily used to lend increased acceleration power to the vehicle in order to minimize the overall size of the main propulsion power plant. The present energy storage device provides a power plant of sufficient energy density to also enable its economic and practical use as the primary energy source in an urban vehicle.

SUMMARY OF THE INVENTION

The present invention encompasses the structure of several disc-type flywheels which are comprised of anisotropic filamentary elements but which are essentially "isotropic" in total structural properties. Effectively, the invention combines desirable characteristics of conventional isotropic flywheel structures, e.g., volumetric efficiency, with the relatively recently conceived advantages of filamentary rotor structures, e.g., high density. The present disc structures permit substantial utilization of the uniaxial strength of each anisotropic filament while packaging the filaments into an extremely compact volume. The resulting structure, although comprised of anisotropic elements, has virtually identical structural character in all radial directions, i.e., the total structure is essentially isotropic.

Although full advantage of the high tensile strength of anisotropic filamentary materials cannot be gained in the present structures, the useful energy available from said structures is of substantial benefit due to the volumetric efficiencies of the structures. Further, the costs of fabrication are often substantially reduced with the present structures. Thus, even though the high tensile strengths of the filamentary materials are only fractionally utilized in the present structures, their high volumetric efficiencies and low costs provide distinct advantages. Since the fraction of the utilizable tensile strength of the anisotropic filaments is essentially a constant for each particular embodiment of the invention, use of filaments exhibiting a high percentage of their tensile strength when woven together results in increased performance.

A major advantage of anisotropic rotary energy storage structures is the favorable "failure mode" of the rotor itself. Isotropic steel flywheels normally rupture into two to four large fragments if design conditions are exceeded or if structural flaws develop, thereby resulting in the disasterous release of large, high kinetic energy fragments. This type of catastrophic failure is avoided to a finite degree in the present anisotropic flywheel. If design speed is exceeded or if flaws in materials or fabrication cause failure of an anisotropic flywheel, the filaments comprising the structure are "ground" to dust or to small straw-like fragments upon contact with a containing structure. Since only a relatively small percentage of the kinetic energy of the structure is transmitted to the containing structure, the kinetic energy in the filaments appears to be dissipated by microfracture of both the filaments and the matrix material and, in certain instances, by vaporization of the matrix material. This inherent ability to absorb internally the major portion of failure energy by microfracture of the matrix and progressive fracture of the brittle filaments relieves the containment problem traditionally encountered with isotropic flywheels.

Generally, the present rotary energy storage structure is a disc-like rotor formed of a plurality of disc-like plates, each plate being formed of a given number of layers of anisotropic filamentary elements, the elements within the layers being interwoven with elements in the other layers to form each plate. The anisotropic filamentary elements within each layer are oriented with their longitudinal axes parallel to each other, the layers within each plate being preferably oriented at regular angles to each other. Although the filamentary elements within each plate are held together by virtue of being interwoven with elements from adjacent layers, a matrix can also be employed to firmly bind the elements together. An adhesive matrix is also used to bind the woven plates into a disc structure of sufficient mass to be useful, the woven plates being "stacked" into the disc shape with the centers thereof lying in a line perpendicular to the planar surfaces of the plates. While the woven plates can be randomly oriented within this stacked disc structure, it is preferred to orient the plates within the structure such that a given planar axis of each woven plate is offset at a regular angle to the planar axis of adjacent plates. The planar axis of a woven plate is defined as a given diameter of the plate which aligns parallel to a given unidirectional layer of filaments within the plate. The flywheel structure thus formed may be of a constant thickness throughout the disc or may be optimized in shape according to particular design requirements, the optimized shape being generally thicker at the center of the disc and tapering to a relatively thin peripheral edge.

Accordingly, it is an object of the invention to provide high power-density energy storage devices which also have high energy densities.

It is a particular object of the invention to provide energy storage devices having high volumetric efficiency and which are relatively inexpensive to produce.

A further object of the invention is to provide rotary energy storage devices comprised of anisotropic filaments or rods but which have substantial isotropic structural character.

Another object of the invention is to provide rotary energy storage devices which dissipate the kinetic energy stored therein on failure of the device by microfracture of the anisotropic elements comprising the device.

A still further object of the invention is to provide "densely-packaged", efficient, economical, high performance and pollution-free energy storage devices useful in an urban vehicle for alleviating the increasing contribution of motorized vehicles to noise and air pollution problems.

Also an object of the invention is to provide an energy storage device comprised of anisotropic filaments which are woven together to form an essentially isotropic structure while retaining effective use of the high tensile strength of the unwoven anisotropic filaments.

Additional objects, advantages, and uses of the invention will become apparent from the following detailed description of the preferred embodiments thereof.

DESCRIPTION OF THE PREFERRED EMBODIMENTS

Figure 1:
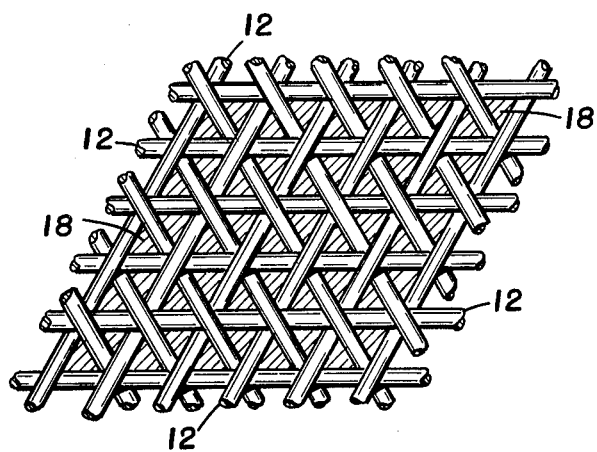
FIG. 1 is an idealized assembly view of a portion of three layers of anisotropic filamentary elements interwoven at a regular angle of 60° in a manner suitable to fabrication of individual plates which comprise the present rotor structure.

The performance, i.e., the stored kinetic energy of a rotary energy storage device, is directly proportional to the usable specific strength of the material used in the fabrication of the device. Isotropic materials, such as solid steel, have most often been used in the construction of "kinetic energy" structures, or "flywheels". However, the best isotropic materil exhibits only a small fraction of the strength-to-density of anisotropic materials, such as boron filaments, graphite fibers, or certain glass fibers. Flywheels configured to utilize a significant portion of the anisotropic strength of uniaxial filamentary or whisker material have been shown to be capable of increased performance relative to flywheels composed of isotropic materials. However, these essentially anisotropic fly-wheel structures have proven costly and often too bulky for certain applications requiring high volumetric efficiency and/or low cost. The embodiments of the present invention provide rotary structures comprised of anisotropic filaments disposed within the structures in such a way as to maximize rotor weight within a given volume and to reduce fabrication costs while retaining at least a significant portion of the high energy densities or prior flywheel structures formed of anisotropic material.

In U.S. Pat. No. 3,788,162, a disc rotor structure is described wherein layers of parallel filamentary elements are bonded together at regular angles to each other to form the structure. In this manner, a structure having essentially isotropic character is formed from essentially anisotropic materials. In the present invention, layers of parallel filamentary elements are interwoven with adjacent layers of such elements, the layers being oriented at regular predetermined angles to each other to form interwoven plate-like units which can then be bonded together to form an essentially isotropic rotor structure. The interwoven plate-like units themselves may be "potted" or impregnated with matrix material prior to or during the bonding together, of the units to provide structural integrity to the units in addition to that realized by virtue of the woven nature of said units. While it is true that the interweaving of the layers of filamentary elements results in the usable strength of the elements being reduced relative to the "straight" or unwoven strength of the elements, the advantage gained by the increase of the total structure in resisting interlaminar shearing forces is compensatory. Certain filamentary elements exhibit a tensile strength when woven of 50% or even less of the normal, unwoven strength. Other elements, such as DuPont's Kevlar, maintain 90% or more of the normal tensile strength when woven together. Thus it can be seen that certain filamentary materials are more useful than other materials for use in the present structures, the utility depending on the usable tensile strength when woven. However, virtually all filamentary materials are useful to a degree in the present structures, costs of the material and the performance demands of a particular rotor useage also being determining factors in the choice of a suitable material for a given rotor structure.

Prior to an additional discussion of suitable materials useful in the fabrication of the invention, it is first desired to describe a first embodiment of the invention in order to put the present discussion in a more specific framework.

Figure 2:
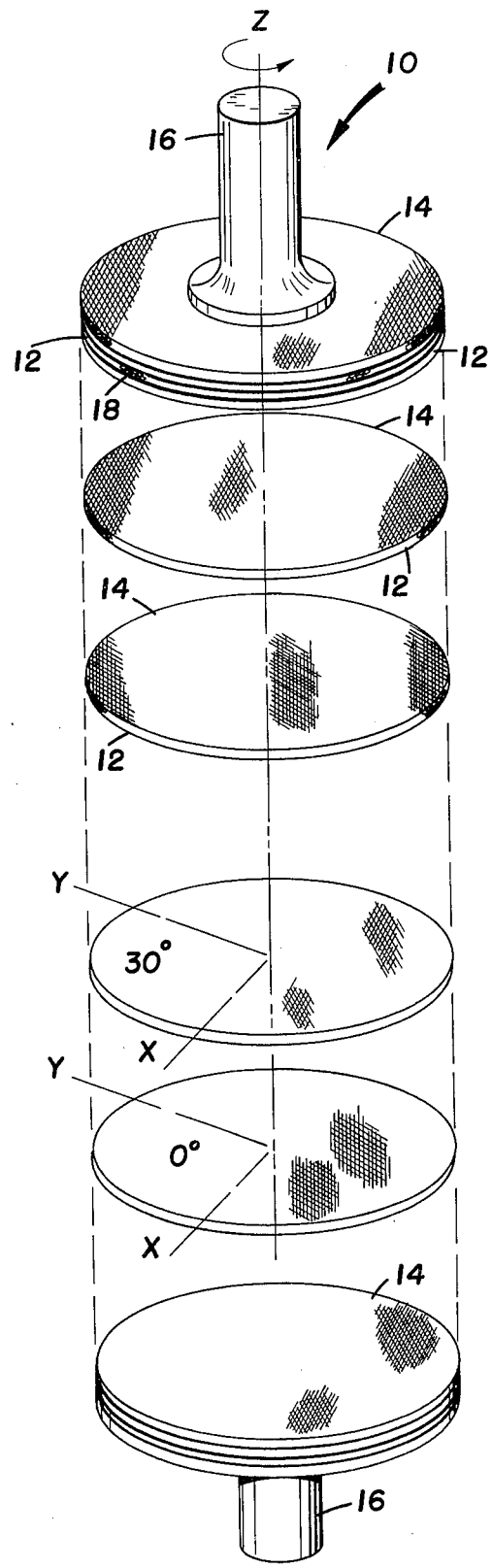
FIG. 2 is an idealized perspective of a disc rotor structure comprised of individual plates formed of interwoven layers of filamentary elements, the plates being oriented at regular preselected angles to each other, certain of the plates being separated from each other to illustrate the orientations of the plates within the structure.

Referring first to FIGS. 1 and 2, a disc rotor structure is seen to be formed of essentially anisotropic filamentary elements 12 which are woven together to form individual plates 14. As can be seen more clearly in the exaggerated view of FIG. 1, the elements 12 are disposed within the plates 14 essentially in unidirectional "layers", i.e., those elements 12 which are parallel to each other are considered to be disposed within a "layer". Thus the layer of elements 12 effectively has a directional axis which is parallel to the longitudinal axes of the elements within each layer. As seen in the embodiment of FIG. 1, three "layers" of the elements 12 are woven together to form one of the plates 14, the disc-like nature of the plates 14 being more clearly seen in FIG. 2. As shown, the axis of each layer, and also the elements 12 themselves, are oriented within the plate 14 at angles relative to each other. In FIG. 1, the layers (and thus the elements 12) are oriented at 60° offsets relative to each other. However, this angular offset can be chosen to be any angle greater than 0° and less than or equal to 90°. The angular offset chosen determines the number of layers of elements 12 which would then comprise a complete plate 14, i.e., a plate 14 wherein no layer would extend in the same "direction" as any other layer within the plate and which would have essentially isotropic character. A 90° offset, such as is shown particularly in FIG. 4, would require only two layers elements 12 in the formation of each plate 14, while a 45° offset would require four layers of elements 12. The angular offset chosen would, for actual applications, be governed by the ease of weaving the layers of elements 12 together, it clearly following that the larger the number of layers of elements 12 which were required to be woven together, the more difficult and more expensive it becomes to form the plate 14. Practical considerations as well as consideration for the desired physical and structural characteristics of each plate 14 make a three-layered plate 14 both adequate and even preferable for use in the fabrication of a full rotor structure.

As seen in FIG. 2, a rotor 10 is built up by stacking a plurality of the woven plates 14 with their centers lying along the Z-axis of the system of reference axes shown. The plates 14 can be rotated in the XY-plane of the reference axes so that a given axis of each of the plates 14 are offset at a regular angle to each other. The given axis of a plate 14 is defined as a directional axis parallel to any given layer of elements 12 within the plate 14. Thus, as shown in FIG. 2, the plates 14 are comprised of layers of elements 12 offset at 60° to each other, the plates 14 then being offset at a 30° angle to each other. In such a situation, alternate plates 14 are identically aligned within the total structure. Just as a variety of angles can be chosen for offsets between the layers of elements 12, different angles may be chosen for offsetting the plates 14 relative to each other. Depending on the choice of angle, the offsetting process will eventually provide at least an effective repeat of the orientation scheme within the total structure. It is to be noted also that the plates 14 can even be randomly oriented within the structure of the rotor 10.

The plates 14 are laminated together through use of a suitable matrix material as will be described hereinafter, resulting in a disc structure having essentially isotropic character, particularly in the XY-plane.

This essentially isotropic character is necessary to accommodate the biaxial stress pattern (from radial and tangential stresses) that is present in a disc flywheel. The summation of the stresses acting on any point of the present invention is carried essentially along the axes of the filaments at that point, thereby utilizing at least a significant portion of the high "unidirectional" strengths of the anisotropic filamentary material. The strength of the laminated disc produced as shown in FIG. 2 is only a fraction of the unidirectional strength of either the filamentary elements 12. However, this finite fractional utilization of these high unidirectional strengths provides a disc flywheel structure of high volumetric efficiency which can store significantly more energy than can an isotropic steel or aluminum disc flywheel. To complete the present structure, the rotor 10 is held by integral shaft-hub mounts 16 aligned on centrally opposite faces of the rotor in a well-known fashion.

A major advantage of the present flywheel structures relative to typical isotropic flywheels made from steel or aluminum is the relatively safe and more easily contained mode of failure. In the case of steel disc flywheels, for example, there is little change in the strength or stiffness of the structure during the development of a flaw in the structure. After the flaw develops, it propagates rapidly and the metal fails within a relatively short time. This flaw development mechanism is essentially the only manner by which a conventional isotropic failure occurs. By contrast, the present structures may fail according to a variety of failure mechanisms, such as delamination, matrix crazing and cracking, void growth, filament failure, or combinations thereof. These failure mechanisms generally progress at a very low rate after their initiation, thereby giving greater opportunity for detection of the flaw. The resistance to fracture of the present structures is greater than that of metal structures and increases with increasing tensile strength of the anisotropic elements comprising the structures. Since the structural stiffness of the several embodiments of the invention often changes after initiation of one or more of the above-named failure mechanisms, the life of the structures may be nondestructively determined by measuring the static resonances or dynamic damping of the structures.

The filamentary elements 12 can now be further defined as to materials suitable for use in the structures described herein. While anisotropic filamentary material of virtually any composition is potentially usable, certain materials naturally exhibit greater uniaxial tensile strength/density ratios than others, especially when woven. The matrix material, shown at 18 in FIGS. 1 and 2, can be used both for holding the elements 12 within each plate 14 and for holding the plates together. The matrix material 18 must have great strength and be compatible with the filamentary material. Boron filaments in an epoxy or magnesium matrix, graphite fibers in epoxy, and glass fibers in an epoxy or polyester matrix are examples of filament/matrix combinations suitable for use in the invention. A particularly useful combination is the Kevlar fiber previously mentioned which could be bonded together with various potting resins such as epoxy. E-glass or S-glass filaments in an epoxy or polyester matrix are also promising materials from the standpoint of costs and performance. Improvements in these materials, such as by protecting the glass filaments during manufacture from both physical and water damage by applying a coating at the instant the glass filament is drawn, will increase the usable tensile strengths of certain glass materials, thus making the characteristic fractional portion of the utilizable tensile strength a larger value. High purity quartz, fused silica, various organic fibers, and a variety of whisker-based materials are other anisotropic filamentary materials from which the embodiments of the invention may be fabricated.

Figure 3:
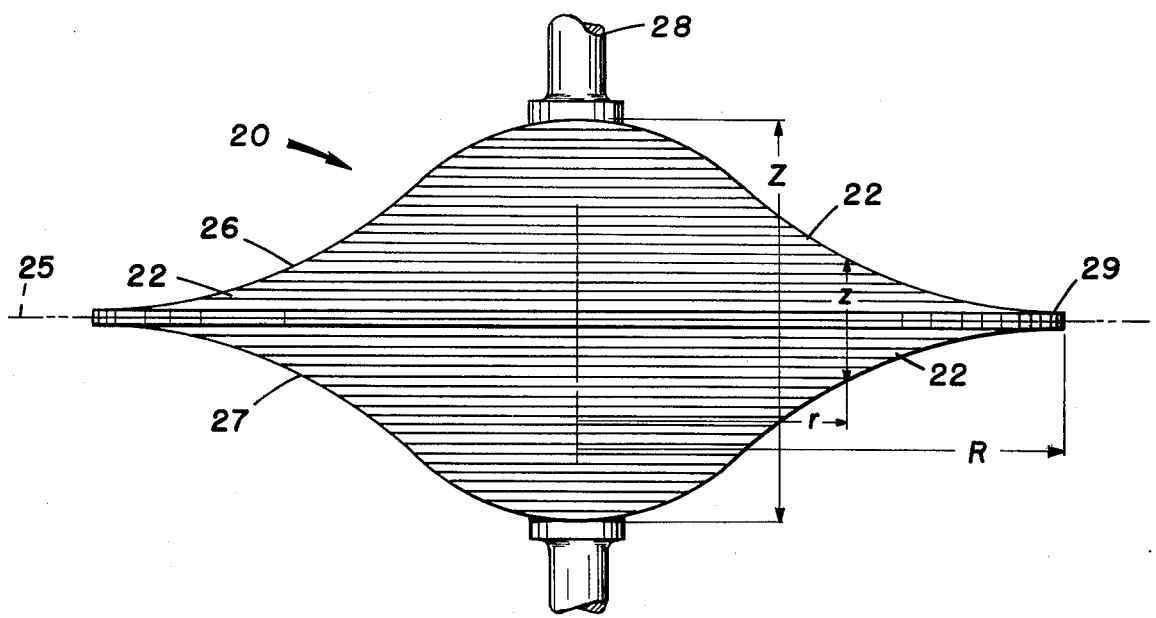
FIG. 3 is an elevation of an optimally shaped disc flywheel comprised of a plurality of woven plates.

An "optimized" disc flywheel is shown at 20 in FIG. 3. Since the combination of radial and tangential stresses acting on the disc flywheel 20 is greatest along its axis of rotation, shaping of the flywheel to provide greater mass at and near the axis of rotation thereof acts to relieve the increased biaxial stress pattern in this area. The shape shown in FIG. 3 is an optimal shape which causes the summation of the major stress components at points on the disc to be essentially equal. The plates 24 are oriented within the structure according to the principals described relative to FIGS. 1 and 2. The oppositely facing surfaces 26 extending from the enlarged central portion of the disc to the periphery thereof are defined by respective lines of rotation which are substantially mirror images across a longitudinal center of the flywheel 20. These lines of rotation could, in a more simple form, be straight lines, thereby producing relatively simple and more readily fabricated surfaces 26. Integral hub and shaft mounts 28 are bonded to opposite surfaces of the flywheel 20, the shaft portions of the mounts 28 having their longitudinal centerlines disposed along the axis of rotation of the disc flywheel 20.

While the surfaces 26 in section illustrate optimized exponentially shaped lines of rotation, "optimization" to varying degrees may be accomplished generally by enlarging the inner central portion of the flywheel 20 relative to the outer peripheral portion thereof. In all such situations, the oppositely facing surfaces of the rotor will be defined by lines of rotation which are substantially mirror images across a longitudinal center line of the rotor. Considering particularly the disc flywheel 20, surfaces 26 and 27 produced by the lines of rotation about center line 25 are characterized by a generally reverse curvature in cross-sectional profile, said surfaces being essentially convex near the axis of rotation of the flywheel and sloping to a substantially concave shape near the periphery 29 of the disc. Thus, the shape of the disc flywheel 20 is seen to generally decrease in thickness from a maximum at and around the axis of rotation to a minimum at the periphery 29 thereof. To achieve maximum theoretical rotor optimization, the thickness at the periphery 29 would continuously diminish to infinity, thus practically producing a razor sharp edge. Practical considerations dictate forming the periphery 29 into a substantially square cut edge. Those portions of the flywheel which constitute the shaped surfaces 26 and 27 are formed of plates 22 of progressively increasing diameter.

By assuming constant stress in the disc flywheel 20, the following relationship defines a family of exponential shapes which form the surfaces 26 and 27:

$$z = Ze^{-kr} \tag{1}$$

wherein:
$z$ = the thickness of the flywheel 20 taken at a given point on the surface of the structure
$Z$ = the maximum thickness of the structure
$r$ = the quotient of the radial distance $r$ of the given point from the axis of rotation divided by the radius R of the flywheel 20
$k$ = a numerical constant
$e$ = the base of the natural system of logarithms The shape of the disc flywheel 20 is that shape given by Equation (1) when $k$ is taken equal to 4. Any choice of $k$ produces a different exponential shape, the value of 4 giving a particularly efficient one.

Figure 4:
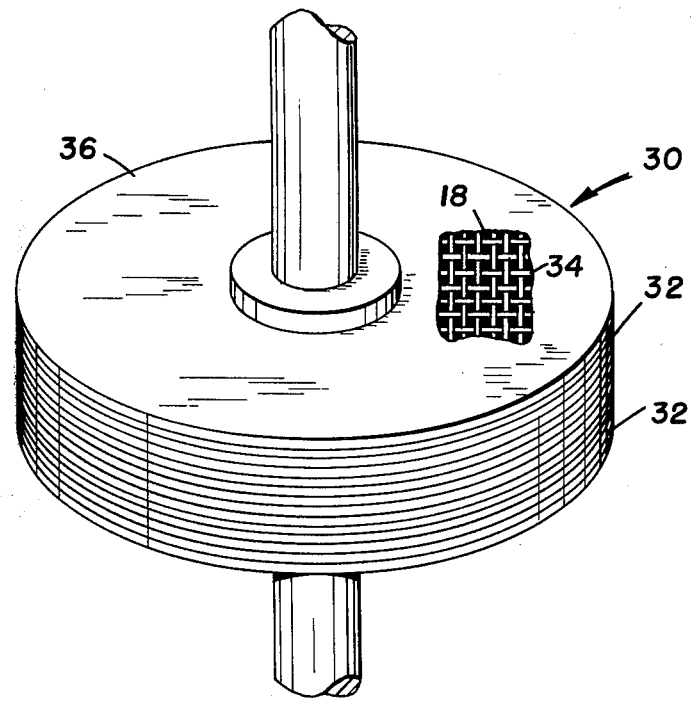
FIG. 4 is a perspective of a disc rotor comprised of plates formed of filamentary layers which are interwoven at a 90° angle; and, FIG. 5 is an idealized perspective of a disc rotor with certain of the plates comprising the rotor being separated from each other for illustrative purpose, the plates within the rotor being interconnected by woven filamentary elements.

FIG. 4 illustrates an assembled disc rotor 30 formed of plates 32 wherein filamentary elements 34, shown enlarged and with exaggerated spacings therebetween, are woven together within the plates at 90° angles to each other. As with the embodiment of FIG. 2, the plates 32 may be oriented at regular angles to each other or may alternatively be randomly disposed within the structure.

Since the use of a matrix material for holding the plates 32 (and potentially the elements 34 within the plates) together is necessary to the structure, it will usually be found desirable to provide a protective coating 36 on the rotor 30 which will not sublimate or "out-gas" when in a vacuum environment. Thus, the matrix material, if susceptible to sublimation or outgassing in the vacuum environment encountered in an operating energy storage system, would be protected by the coating 36. A portion of the coating 36 is shown removed in FIG. 4 in order to illustrate the weave of the elements 34 within the uppermost plate 32.

Figure 5:
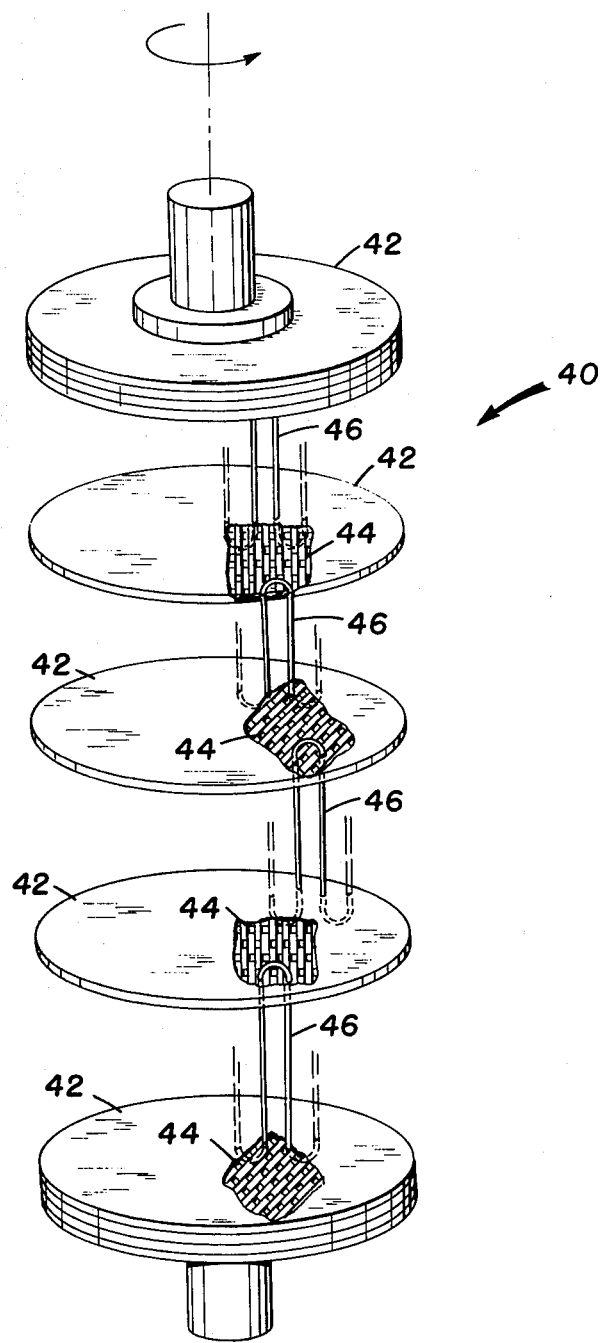

FIG. 5 illustrates inter alia a rotor 40 formed substantially the same as the rotor 10 of FIG. 2 except that each woven plate 42 is additionally held to adjacent plates by filamentary elements 46 (in addition to the elements 44 normally forming the plates 42) woven between the plates 42. While only one strand of the elements 46 is shown between the adjacent plates, it is to be understood that a plurality of the elements 46 are to be woven across the faces of the plates. When coupled with the use of a matrix material between the plates 42, additional resistance to shearing and delaminating forces is imparted to the structure.

FIG. 5 additionally illustrates the formation of a rotor structure wherein one of the plates 42 lies in the midplane of the structure. FIG. 2 illustrates an embodiment wherein the mid-plane of the structure lies between the two innermost plates forming the structure.

The embodiments of the invention described above offer the prospects of high specific energy storage within a compact unit while retaining a relatively safe mode of failure. It can particularly be seen that the energy storage capability of the present rotors depends in large measure on the judicious choice of a material for the filamentary elements which retains a high degree of its inherent tensile strength when woven. It is therefore to be understood that the foregoing description of the invention is illustrative, and that various modifications to the structure and manner of fabrication of the flywheels disclosed herein may be made without departing from the scope of the invention.

What is claimed is:

1. An energy storage structure rotatable about an axis of rotation extending transversely therethrough, the structure comprising a plurality of substantially identical anisotropic filament-like members, the members being formed into a disc shape and being interwoven within the structure to produce bi-axial resistance to the radial and tangential stress pattern acting on the structure.

2. The energy storage structure of claim 1, wherein the anisotropic filament-like members are formed into essentially circular plates, each plate being comprised of layers of said members, the members within any given layer being parallel, and wherein each layer is disposed within the plate at an angle with respect to at least the adjacent layers, the members of each layer being interwoven with the members of at least the adjacent layers.

3. The energy storage structure of claim 2, wherein said structure has a symmetrical cross-sectional profile defined by opposed surfaces about the axis of rotation, said structure being relatively thick around said axis and relatively thin about the periphery thereof.

4. The energy storage structure of claim 3, wherein the surfaces of the symmetrical cross-sectional profile each have the shape of an exponential curve and are symmetrical about a plane extending through the geometrical center of the structure and perpendicular to the axis of rotation.

5. The energy storage structure of claim 1, wherein said structure is symmetrically contoured in cross-section about said axis of rotation and has a center portion of maximum thickness around said axis and a peripheral end portion of minimum thickness, the center portion of the structure having a cross-sectional thickness diminishing non-uniformly from said maximum to said minimum according to the relation:

$$z = Ze^{-kr}$$

wherein:
$z$ = the thickness of the structure taken at a given point on the surface of the structure
$Z$ = the maximum thickness of the structure
$r$ = the quotient of the radial distance of the given point from the axis of rotation divided by the radius of the structure
$k$ = a numerical constant
$e$ = the base of the natural system of logarithms.

6. The energy storage structure of claim 5, wherein the numerical constant $k$ is equal to 4.

7. An energy storage structure rotatable about an axis of rotation extending transversely therethrough, the structure comprising a plurality of substantially identical anisotropic filamentary members, a multiplicity of the members being formed together into flat circular layers and having the longitudinal axis of each member oriented therein substantially parallel to the longitudinal axes of adjacent members, a planar axis of each layer being defined by the longitudinal axis of the member extending through the geometrical center of said layer, the layers being aligned and woven together, the centers of the layers lying along the axis of rotation of the structure, the planar axis of each layer forming an equal angle with the planar axes of adjacent layers.

8. The energy storage structure of claim 7, wherein the angle formed by the planar axes of adjacent layers is equal to 60°.

9. The energy storage structure of claim 7, wherein the angle formed by the planar axes of adjacent layers is equal to 90°.

10. The energy storage structure of claim 7, wherein the angle formed by the planar axes of adjacent layers is equal to 45°.

11. An energy storage structure rotatable about an axis of rotation extending transversely therethrough, comprising a plurality of flat circular layers, each said layer being comprised of substantially identical and mutually parallel anisotropic filament-like members, the layers being aligned and woven together within disc-like plates with their centers lying along the axis of rotation of the structure; and matrix means for bonding the plates into a unitary structure.

12. The energy storage structure of claim 7 and further comprising means interconnecting at least two of the interwoven groups of layers of filamentary members.

13. The energy storage structure of claim 12 wherein the interconnecting means comprise strands of filamentary elements woven into each of the interwoven groups of layers.

* * * * *

UNITED STATES PATENT OFFICE
CERTIFICATE OF CORRECTION

PATENT NO. : 4,000,665
DATED : January 4, 1977
INVENTOR(S) : David W. Rabenhorst It is certified that error appears in the above-identified patent and that said Letters Patent are hereby corrected as shown below:

Column 8, line 22, should read --- $z = Ze^{-k\bar{r}^2}$ ---.
Column 10, line 1, should read --- $z = Ze^{-k\bar{r}^2}$ ---.
Column 8, line 28, "r" should read ---$\bar{r}$---.
Column 10, line 7, "r" should read ---$\bar{r}$---.

Signed and Sealed this

Twelfth Day of April 1977

[SEAL]

Attest:

RUTH C. MASON
*Attesting Officer*

C. MARSHALL DANN
*Commissioner of Patents and Trademarks*